(12) United States Patent
Misra et al.

(10) Patent No.: US 8,108,332 B2
(45) Date of Patent: Jan. 31, 2012

(54) METHODS AND SYSTEMS FOR SELECTING FEATURES AND USING THE SELECTED FEATURES TO PERFORM A CLASSIFICATION

(75) Inventors: Archan Misra, Bridgewater, NJ (US); Ya-Ti Peng, Seattle, WA (US); Daby Mousse Sow, Croton On Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 12/106,843

(22) Filed: Apr. 21, 2008

(65) Prior Publication Data
US 2009/0265297 A1 Oct. 22, 2009

(51) Int. Cl.
G06F 9/44 (2006.01)
G06N 7/02 (2006.01)
G06N 7/06 (2006.01)
(52) U.S. Cl. .......................................................... 706/52
(58) Field of Classification Search .................. None
See application file for complete search history.

(56) References Cited

U.S. PATENT DOCUMENTS

| | | | | |
|---|---|---|---|---|
| 6,137,909 A | * | 10/2000 | Greineder et al. | 382/190 |
| 2005/0245973 A1 | * | 11/2005 | Sherman | 607/5 |
| 2006/0177196 A1 | * | 8/2006 | Mukunashi | 386/68 |

OTHER PUBLICATIONS

'Biostream: A system architecture for real time processing of physiological signals': Bar-Or, 2004, IEEE, 0-7803-8439, pp. 3101-3104.*

'Harmoni: Context aware filtering of sensor data for continuous remote health monitoring': Mohomed, 2008, IEEE, 0-7695-3113, pp. 248-251.*

'Data scaling in remote health monitoring systems': Peng, 2008, IEEE, 978-1-4244-1684, pp. 2042-2045.*

'The world according to wavelets': Hubbard, 1998, A K Peters.*

'Comparison of data analysis and classification algorithms for automatic target recognition': Abbott, 1994, IEEE, 0-7803-2129, pp. 902-907.*

'Efficient dimensionality reduction approaches for feature selection': Deisy, 2007, IEEE, International conference on computational intelligence and multimedia applications, IEEE, 0-7695-3050-8, pp. 121-127.*

Isabelle Gyuon, Andre Elisseeff, An Introduction to Variable and Feature Selection, Journal of Machine Learning Research 3 (2003) 1157-1182, submitted Nov. 2002; Published Mar. 2003.

(Continued)

*Primary Examiner* — Omar Fernandez Rivas
*Assistant Examiner* — Peter Coughlan
(74) *Attorney, Agent, or Firm* — F. Chau & Associates, LLC; Preston J. Young

(57) ABSTRACT

A method is provided for performing a classification. The method includes ranking a plurality of features of a training set according to how closely they are correlated to their corresponding classifications, extracting a plurality of features of from input data, selecting a subset of the plurality of features such that a computational resource cost of the subset is less than a predefined computational resource maximum and a degree of utility achieved by a classification of the subset by a selected classifier is optimized and exceeds a predefined utility minimum, predicting one of the features of the sensor data that is not selected for the subset of features from a predefined number of past samples of the feature and adding the predicted feature to the subset of features, and classifying, by a processor, using the selected classifier and the resulting subset of features.

22 Claims, 6 Drawing Sheets

OTHER PUBLICATIONS

Rajesh Krishna Balan, Mahadev Satyanarayanan, Darren Gergle, Jim Herbsleb, Simplifying Cyber Foraging for Mobile Devices, Research supported by National Science Foundation (NSF) under grant Nos. ANI-0081396 and CCR-0205266, and equipment grant from Hewlett-Packard Corporation (HP).

Lei Yu, Huan Liu, Efficient Feature Selection via Analysis of Relevance and Redundancy, Journal of Machine Learning Research 5 (2004) 1205-1224, submitted Jan. 2004; Revised May 2004; Published Oct. 2004.

Vivek K. Goyal, Beyond Traditional Transform Coding, dissertation submitted in satisfaction of requirements for degree of Doctor of Philosophy in Engineering—Electrical Engineering and Computer Science in the Graduate Division of the University of California, Berkeley, Fall 1998.

* cited by examiner

METHODS AND SYSTEMS FOR SELECTING FEATURES AND USING THE SELECTED FEATURES TO PERFORM A CLASSIFICATION

BACKGROUND

1. Technical Field

The present disclosure relates generally to resource management in distributed computing environments, and more particularly, to methods for scaling down a classification computation by trading computational accuracy for computational resources.

2. Discussion of Related Art

An increasing number of sources of information are available due to the emergence of new sensor technologies. For example, various types of remote health monitoring technologies are being developed in the field of healthcare. In such settings, patients are surrounded by biomedical and environmental sensors able to collect enough data for medical professionals to continuously obtain detailed reports on the health of their patients.

Such remote monitoring systems may be highly distributed. They often adhere to a three tiered architecture: the sensor tier where data is collected, the hub tier where data is aggregated and normalized, and the server tier where data is analyzed. From a computational resource perspective, each tier has a very different profile. Indeed, at the sensor tier, power, central processing unit (CPU), memory and bandwidth resources are scarce. At the hub tier, more computational resources are available but not abundant. The server tier is by far the richer part of this architecture, in terms of computational resources. However, as more and more users are pumping data towards the server tier, it may also be operating under tight resource constraints.

These remote monitoring systems exchanges and process information. Hence, one may naturally refer to information theoretic concepts to model and optimize them. However, most applications of conventional information theory operate under three basic assumptions when attempting to transmit information in an efficient manner: (1) the encoder has access to an infinite amount of computational resources, (2) the encoding side of the communication system has more computational resources than the decoding end, and (3) the semantics of the messages transmitted are irrelevant to the transmission problem.

However, conventional information theory does not address the transmission of only parts of the message that are meaningful to the decoding end. Further, while these assumptions may hold for most broadcasting applications (e.g., digital video broadcasting), they fall short for sensor network and peer to peer applications. One can not assume the availability of large amounts of resources at the encoding end in network and peer to peer applications. There is a limited amount of computational resources available at the encoder and there is only an interest in the transmission of information that is relevant or important to a particular application. For example, if an abnormal pulse signal needs to be analyzed in the back end, there is no need for the sensor collecting pulse data to send readings that are in the normal ranges. Moreover, these application needs can change dynamically.

There is a need for adaptive techniques that are able to maximize the utility of the computation taking place, under dynamic resource constraints.

SUMMARY

An exemplary embodiment of the present invention provides a method for selecting features for classification that trades classification efficiency for computational resources. The method includes extracting a plurality of features from data, ranking a plurality of features of a training set according to how closely they are correlated to their corresponding classifications, and selecting a subset of the features of the data, according to the ranking of the features obtained from analysis of the training data, such that a computational resource cost of the subset is less than a predefined computational resource maximum and the degree of utility achieved by a classification of the subset of features by a selected classifier is optimized and exceeds a predefined utility minimum.

An exemplary embodiment of the present invention provides a method for selecting an optimal classifier. The method includes testing a list of classifiers on a specific classification problem, and setting the selected classifiers to a classifier from the list that has the highest rank, where the classifiers have been previously ranked based on their degree of utility at classifying data for the given classification problem.

An exemplary embodiment of the present invention provides a distributed system for classifying remote sensor data. The system includes a plurality of sensors receiving sensor data, a feature ranking unit, a feature selection unit, and a classification unit. The feature ranking unit ranks features in training data based on how well the features in the training data correlate with their classifications. The feature selection unit is configured to select a subset of features of the sensor data, according to the ranking of the features of the training data that reduces computational resource usage of a selected classifier and retains a minimum degree of classification utility by the selected classifier. The classification unit includes the selected classifier for classifying the selected subset of features.

An exemplary embodiment of the present invention provides a method for compressing sensor data. The method includes receiving a training set that includes a plurality of features and their corresponding classifications, ranking the features according to how closely they are correlated to their corresponding classifications, and beginning with the highest ranked feature and until an optimum subset of features has been determined, adding a next feature of the ranked features to a set of features, and setting the optimum subset of features to the current set of features when a cost of the current set of features is less than a predefined minimum cost, and compressing the sensor data by removing features of the input data that do not match the optimum subset of features.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

In general, exemplary methods and systems for scaling down data for classification will now be discussed in further detail with reference to illustrative embodiments of FIGS. 1-6.

It is to be understood that the methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
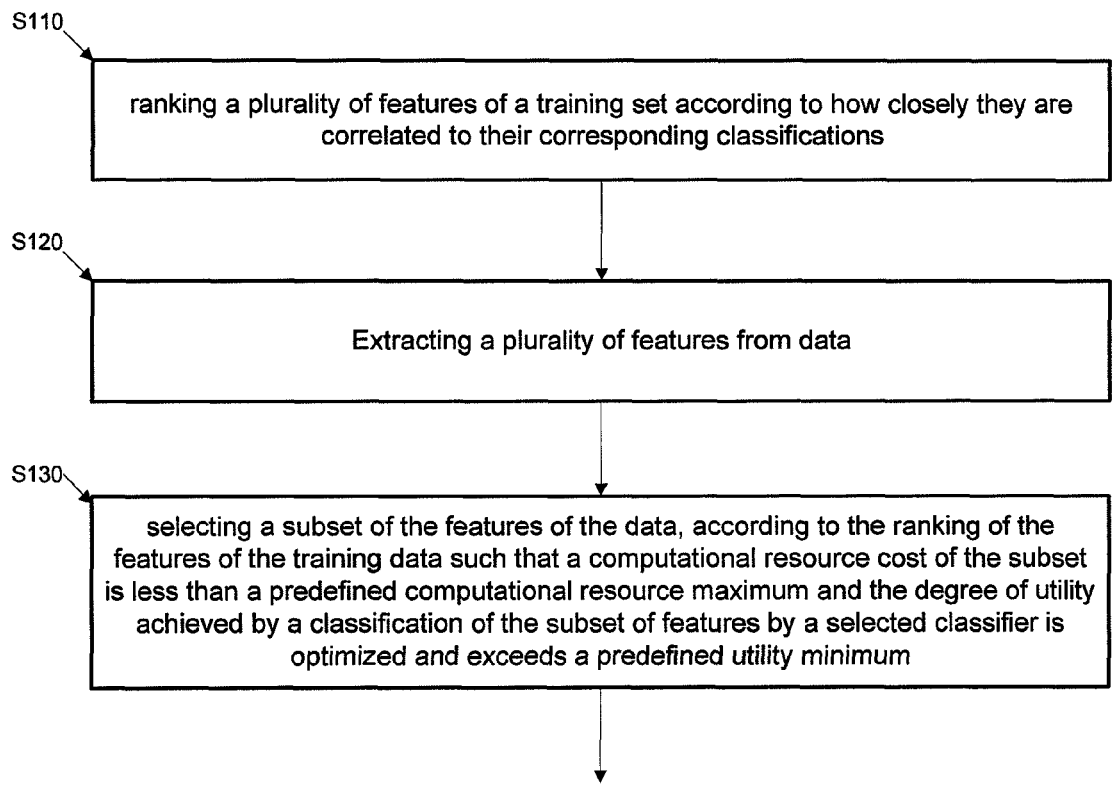
FIG. 1 illustrates a method of scaling down sensor data for subsequent classification according to an exemplary embodiment of the present invention.

FIG. 1 illustrates a method of scaling down sensor data for subsequent classification according to an exemplary embodiment of the present invention. Referring to FIG. 1, in block (S110), the features of a training set are ranked according to how closely they are correlated to their corresponding classifications. In block (S120), sensor data that includes a plurality of features is received. In block (S130), a subset of the features of the sensor data is selected, according to the ranking of the features of the training data such that a computational resource cost of the subset is less than a predefined computational resource maximum and the degree of utility achieved by a classification of the subset of features by a selected classifier is optimized and exceeds a predefined utility minimum.

The computation resource cost may include at least one of the following cost measures: transmission bandwidth, latency in terms of the amount of time needed by the classifier to classify the data, the amount of memory needed by the classifier to classify the data, or the amount of power needed by the classifier to classify the data.

The ranking of the features may include computing variants of the information theoretic mutual information between each feature and the corresponding classification and ordering the features by computed mutual information values. These values indicate how much information is shared between the features in question and the classification. The features may be ranked using the fast correlation-based filter operation which is a variant of the information theoretic mutual information.

The classifier may be selected by testing a list of classifier on a specific classification problem and setting the selected classifier to a classifier from the list that has the highest rank, where the classifiers have been previously ranked based on their degree of utility at classifying data for the type. The selection of the optimal classifier may be formulated as a optimization problem where the classifier that maximizes process utility under resource constraints is determined.

Once an optimal classifier has been selected, a method is used to process only a subset of the input data in a way to optimize data utility under resource usage constraints. This is achieved by a scheme that extracts and selects dominant features from the sensor input data streams. The selected subset of dominant features can then be classified using the selected classifier the classification is performed, at least one of the features of the sensor data that is not selected for the subset of features may be predicted from a predefined number of past samples of the feature. The sensor data can then be classified using both the subset of features and the predicted features. The prediction may be performed using a temporal linear prediction operation. The predicted feature may only be used when an error between the predicted feature and the past samples is below a predefined prediction error value.

Figure 2:
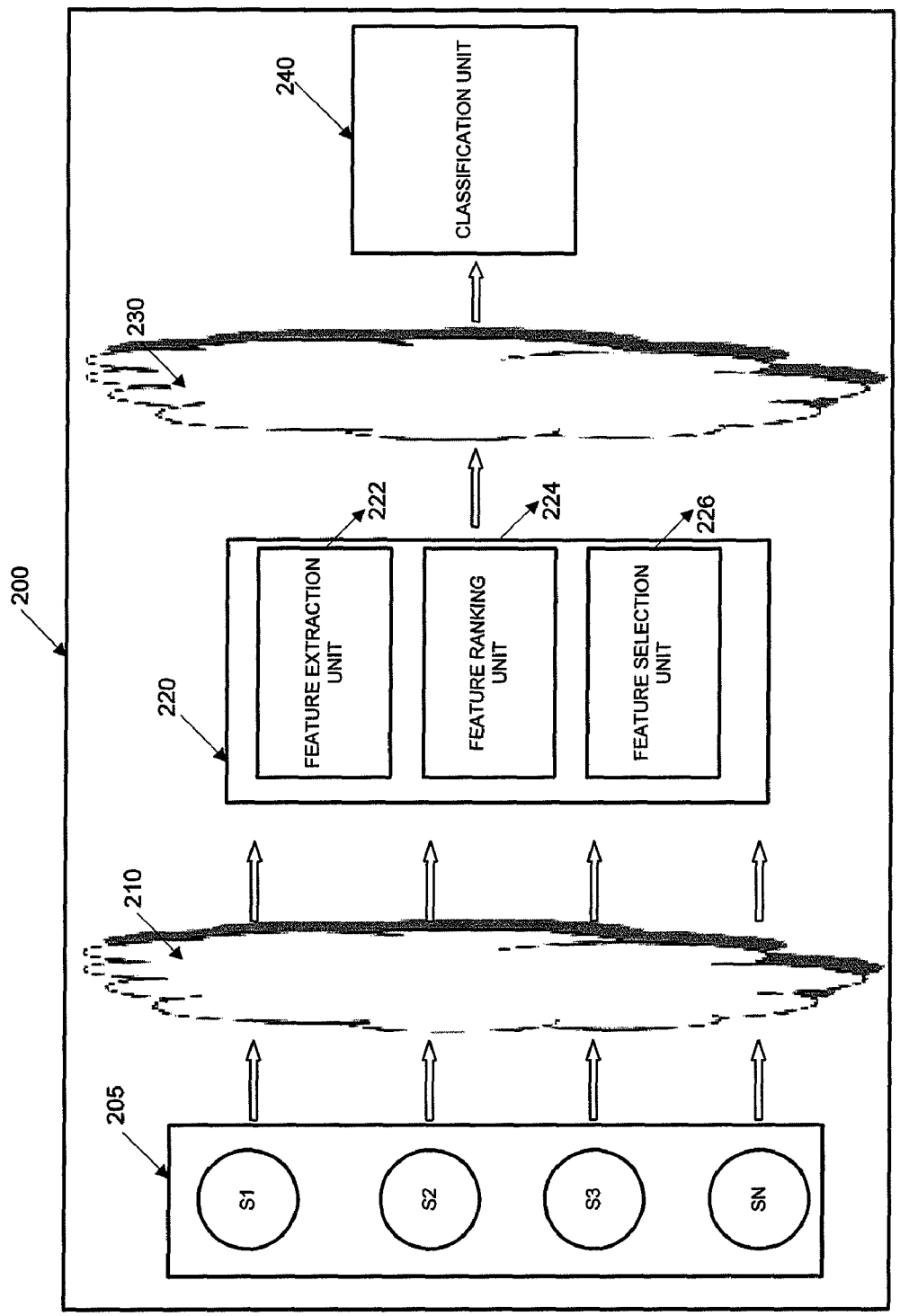
FIG. 2 illustrates a distributed system for classifying remote sensor data according to an exemplary embodiment of the present invention.

FIG. 2 illustrates a distributed system (200) that may be used to implement the method of FIG. 1. The system (200) includes a plurality of sensors (S1, S2, S3, ..., SN), a feature extraction unit (222), a feature ranking unit (224), a feature selection unit (226), and a classification unit (240). The sensors may reside within a sensor tier (205) where data is collected. The feature extraction unit (222), feature ranking unit (224), and feature selection unit (226) may reside within a hub tier (220) where data is aggregated and normalized.

The sensor tier (205) may communicate sensor data collected by the sensors across a first channel (210) to the hub tier (240). The hub tier (220) can forward the sensor data across a second channel (230) to the classification unit (240) for subsequent classification. The hub tier (220) can implement the method of FIG. 1 to scale down the sensor data before it is forwarded to the classification unit (240).

The system (200) may include a pre-processor to perform a de-noising operation on the sensor data received from the sensors. For Electrocardiogram (ECG) classification, the pre-processor may include a low-pass filter with a pass-band of about 0.4 of about 40 Hz to remove machine generated noise from incoming ECG data. Following this de-noising, a Q wave, R wave, S wave (QRS) detector can be used to delimitate beats in the data. The feature extraction unit (222) extracts features from the sensor data. For example, for a classification of ECG data, a P-level wavelet transform can be applied to the data, where the jth level transform coefficients can be represented by equation 1 as follows:

$$y_{lj}[n]=y_{l(j-1)}[n]*g[2n] \text{ and } y_{hj}[n]=y_{l(j-1)}[n]*h[2n] \quad (1)$$

The wavelet transform may be, for example, a Haar wavelet (e.g., g[n]={0.70711, 0.70711} and h[n]={−0.70711, 0.70711}), which has a low computational complexity. The wavelet transform may be applied to every beat segment (e.g, $y_{l0}[n]$) covering, for example, signals ranging between about 0.2 second before till about 0.4 second after a detected R wave peak.

Although FIG. 2 illustrates that data scaling is being performed at the hub, this operation may reside inside the other tiers, depending on the specific cost and utility metrics used for the optimization.

In a preferred embodiment of the present invention, the classifier is chosen from a group of classifiers based on its ability to reduce resource specific costs and maintain a minimum degree of utility for classifying the data. The selection of the classifier is called process scaling, while the selection of the subset of features discussed above, is called data scaling.

Process scaling treats a software component as a transparent box. It refers to techniques modifying the computation taking place inside the software component in an attempt to optimize resources. Process scaling may require the implementation of several different methods operating at different resource consumption levels and providing different levels of utility. For example, during the testing phase of a classification problem, the system may switch from a neural network classifier to a simple and small decision tree classifier to save computational resources. In this setting, scaling is attained by dynamically indexing the right classifier with an optimal utility under resource constraints.

Data Scaling treats the software component as an opaque box. It refers to techniques modifying the amount of data processed by software components to optimize resources. Data scaling revolves around the assumption that the amount of resources needed for a computation is intimately related to the amount of information presented at the input of the computation. Referring back to the classification example mentioned above, data scaling may be achieved by filtering the inputs to extract a subset of the most dominant features for the classification problem at hand.

An exemplary embodiment of the present invention provides a method that combines both process and data scaling approaches. Given a resource constraint, process scaling is first applied to identify the right classifier for the target complexity range. The identification uses a ranking of pre-defined classifiers that has been performed either statically (offline), dynamically or even theoretically. A set of S classifiers is ranked based on their utility for the problem at hand. For example, during ECG classification, experimental tests using a neural network (NN) classifier and a support vector machine classifier might reveal the superiority of the support vector machine (SVM) classifier for the problem at hand, resulting in the SVM classifier being ranked higher than the NN classifier.

The next step is to periodically perform a data scaling procedure. The correlation between the output and the input features is measured, in the training data. Input features are then ranked according to their correlations. At runtime, input features are dynamically selected to meet complexity constraints, while maximizing the utility of the classification. This dynamic feature selection process is greatly facilitated by the ranking of the features. The missing features that have not been selected may be predicted from past observations to boost the overall utility.

Let F represent a computation taking as inputs, n elements $f_i$, $0 \leq i < n$, and producing k output elements $o_j$, $0 \leq j < k$. An implementation for F is represented as $C_F$ in the following equation 2:

$$(o_0, o_1, o_2, o_3, \ldots, o_{k-1}) = C_F(f_0, f_1, f_2, \ldots, f_{n-1}). \quad (2)$$

Applying $C_F$ to $f_0, f_1, f_2, \ldots, f_{n-1}$ comes with a certain utility $U_P$. As stated above, each different implementation for F produces a different process utility. For instance, if utility is synonymous with prediction accuracy, two different classifiers applied to the same prediction problem are quite likely to produce different accuracies in their predictions. The process utility for an $C_F$, the implementation of F, is denoted by $U_P(C_F)$. In at least one embodiment of the present invention, $U_P(C_F)$ is used to rank classifiers for a subsequent classification.

Another important utility function is the data utility, $U_D$. In a data oriented approach, $U_D$ measures the utility of the input for the computation F. $U_D$ becomes a measure of the amount of relevant information conveyed by the inputs to F. Consequently, an appropriate metric for $U_D$ is the information theoretic mutual information $I(f_0, f_1, f_2, \ldots, f_{n-1}; o_0, o_1, o_2, o_3, \ldots, o_{k-1})$ between $o_0, o_1, o_2, o_3, \ldots, o_{k-1}$ and $f_0, f_1, f_2, \ldots, f_{n-1}$. In a preferred embodiment of the present invention, data utility is defined with respect to F, and not with respect to any of its implementations $C_F$. Process utility is separated from data utility. However, joint optimizations of process and data utilities may also be performed.

Applying $C_F$ to $f_0, f_1, f_2, \ldots, f_{n-1}$ comes with a cost B related to resource consumption. An example of a cost metric may measure the amount of bandwidth needed to transmit the data needed for a computation. Another cost metric might measure the amount of computational complexity (e.g., time and memory) needed for the computation of $C_F(f_0, f_1, f_2, \ldots, f_{n-1})$. Cost metrics can depend on the resource of interest. Some metrics (e.g., power consumption metrics) may be highly dependent on the actual implementation of the process for the computation that takes place. Other metrics, such as bandwidth, are data dependent, not process dependent. Consequently, data costs $B_D$ are separated from process or resource specific costs, $B_P$. Data cost may be defined as the amount of information that is processed. Process or resource specific costs may be defined as any monotonic function linking the amount of information being processed to the resource usage. B may then be obtained by composing $B_D$ and $B_R$ according to equation 3 as follows:

$$B = B_P \circ B_D, \quad (3)$$

where o is the composition operator. For example, if the metric of concern is bandwidth, then the relevant part of the cost function is related to the amount of information needed for the computation. This amount is an intrinsic property of the inputs, not the process. The cost function can be expressed according to equation 4 as follows:

$$B_D(f_0, f_1, f_2, \ldots, f_{n-1}) = c \cdot n, \text{ and } B_P(x) = x. \quad (4)$$

This example assumes that the transmission cost for each of the input features $f_i$ is the same and equal to c. It tracks bandwidth consumption since the composition $B = B_P \circ B_D$ measures the volume of data associated with transmission of inputs to $C_F$. When the metric of interest is power consumption, both the amount of data transmitted and the computational complexity of $C_F$ are important. When this occurs, the cost function can be expressed according to equation 5 as follows:

$$B_D(f_0, f_1, f_2, \ldots, f_{n-1}) = c \cdot n, \text{ and } B_P(C_F) = v \cdot n^2, \quad (5)$$

where v is a constant. Here, it is assumed that the power consumption for the computation $C_F$ increases in a quadratic fashion with the size of the inputs. However, $B_P$ can be obtained experimentally or analytically.

Simple transformation functions Q for transforming the inputs $f_0, f_1, f_2, \ldots, f_{n-1}$ into $f^*_0, f^*_1, f^*_2, \ldots, f^*_{m-1}$, where $m \leq n$, are sought to maximize U under cost constraints. Data scaling may be achieved by using the minimal number of features needed to achieve a minimal utility. Conversely, data scaling may be achieved by maximizing utility under a data cost constraint that translates itself into a maximum number of features that can be used for the computation. In a preferred embodiment of the present invention, a fast correlation-based filter (FCBF) operation is used to leverage mutual information (e.g., Symmetrical Uncertainty (SU) in FCBF), to rank features based on their predictive capability and obtain non-redundant subsets of dominant features for a classification problem. Symmetrical Uncertainty (SU) is the normalization of mutual information or the information gain for two random variables Y and Z, as defined by equation 6 as follows:

$$SU_{Y,Z} = 2\left[\frac{I(Y;Z)}{E_Y + E_Z}\right] = 2\left[\frac{E_Y - E_{Y|Z}}{E_Y + E_Z}\right] \quad (6)$$

The FCBF operation attempts to identify a small set of features with little correlation across them.

Figure 3:
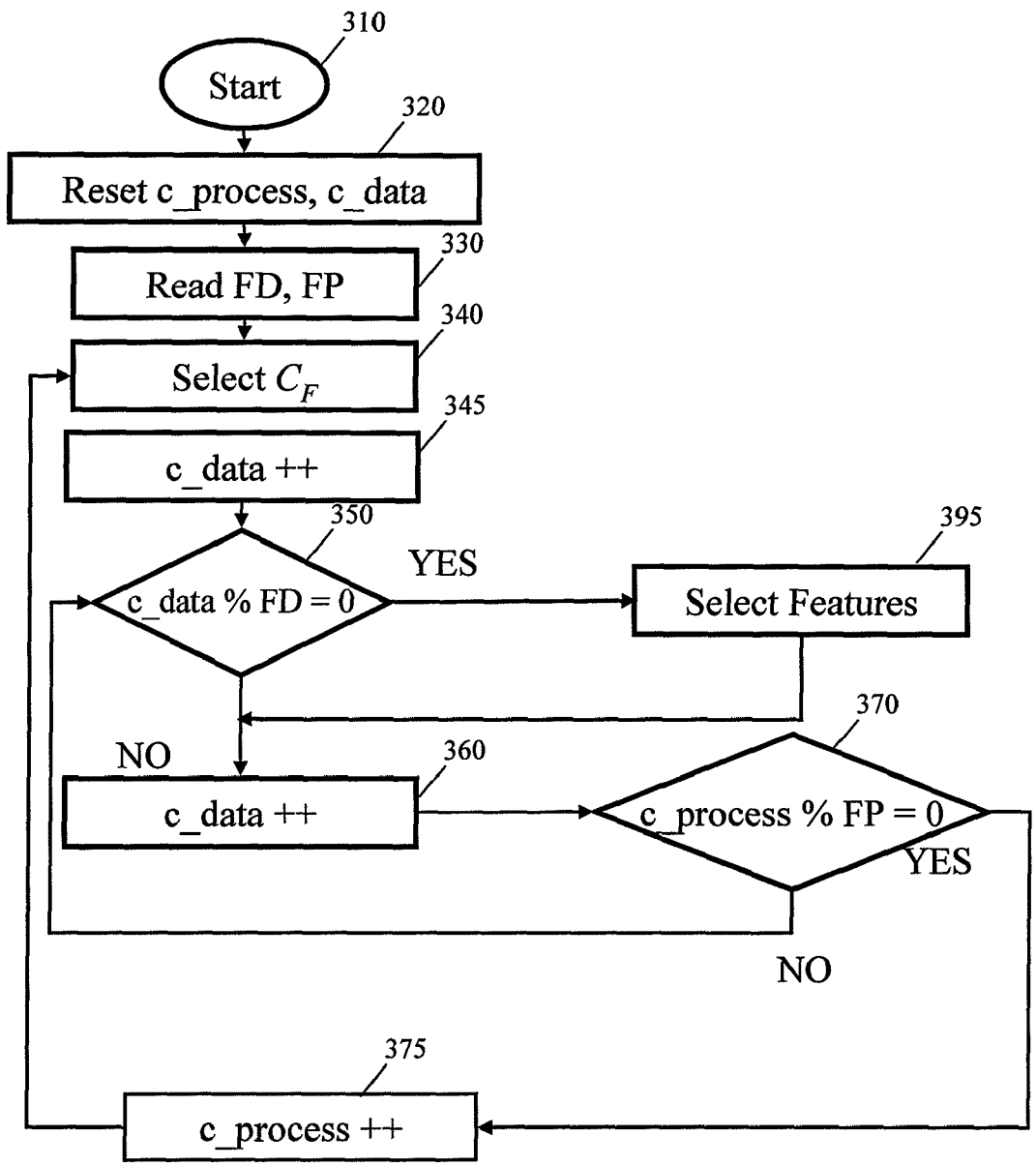
FIG. 3 illustrates a method of adaptively scaling down sensor data for subsequent classification, according to an exemplary embodiment of the present invention.

FIG. 3 illustrates a method of adaptively scaling down data for classification according to an exemplary embodiment of the present invention. In (310), counters, c_process and c_data are initialized. In block (320), values for variables FD and FP are read. FD and FP are used to track respectively the frequencies at which changes of implementations for $C_F$ are being performed and the frequency at which the input feature selection is to take place. In block (340), $C_F$, an optimal implementation for F, is selected according to a method described below and shown in FIG. 4. The counter c_data is then incremented in block (345). In block (350), a test is performed to determine whether an optimal subset of features should be selected. In FIG. 3, the test is a modulus (e.g., %) operator. For example, if FD were set equal to 0, a selection of the features would occur whenever c_data is an even number. The test may be performed using other types of operators. If it is determined that a selection of the features is to occur, the features are selected in block (395), where input features are selected, according to a method proposed in FIG. 5. If it is determined that a selection of the features is not to occur, counter c_data is incremented in block (360) before testing whether a new $C_F$ should be selected in block (370). If it is determined that a new $C_F$ should be selected, counter c_process is incremented in block (375) and the method resumes at block (340). If it is determined that a new $C_F$ is not to be selected, the method resumes at block (350).

Figure 4:
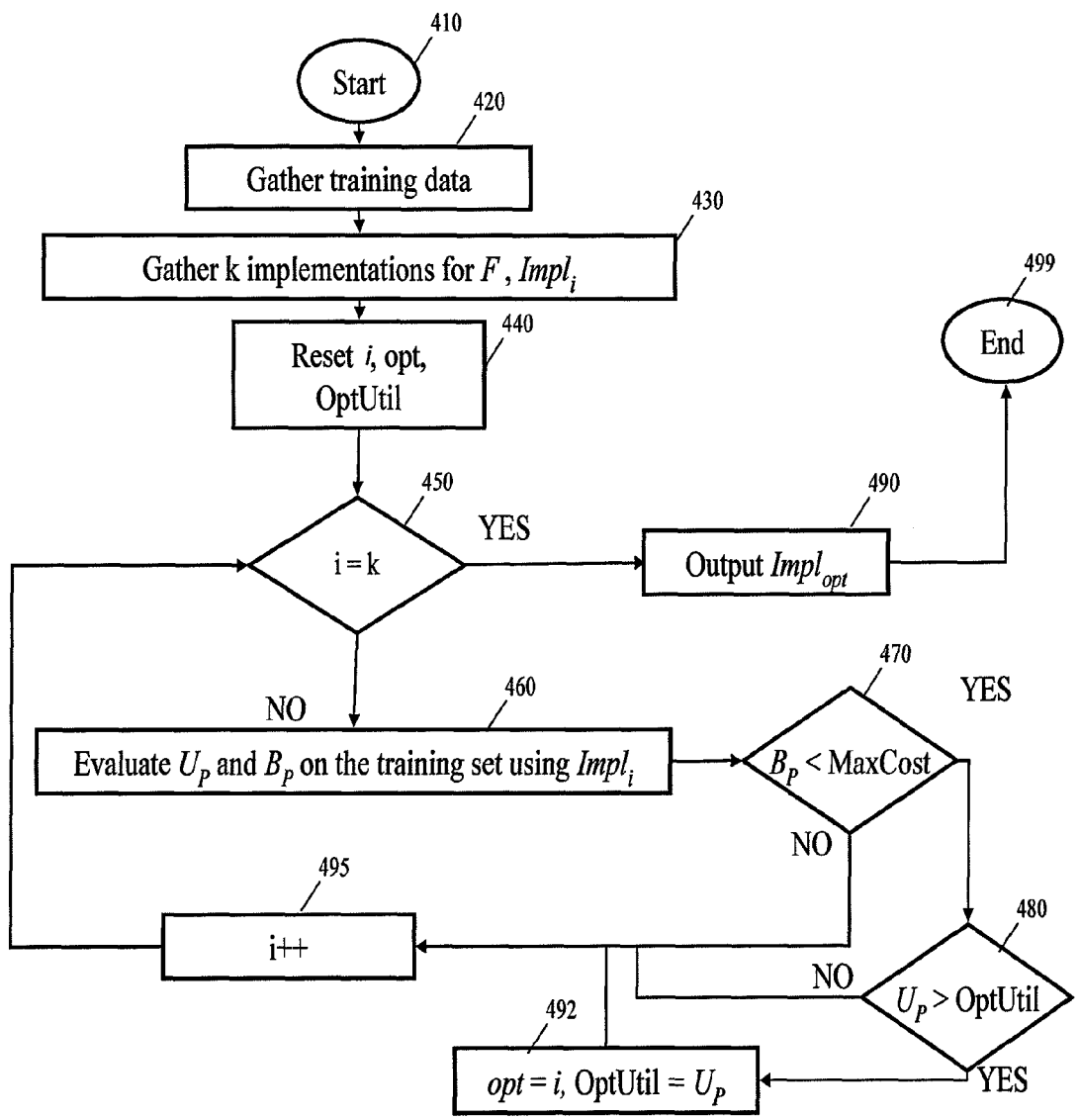
FIG. 4 illustrates a method of selecting a classifier that may be used in the method of FIG. 3, according to an exemplary embodiment of the present invention.

FIG. 4 illustrates a method for selecting the new $C_F$ (e.g., a new classifier) in block (340) of FIG. 3, according to an exemplary embodiment of the present invention. The purpose of this method is to identify the best implementation for F according to predefined utility and cost functions. After the method begins in block (410), training data is gathered for the classification problem in block (420). Several implementations for F are gathered in block (430). It is assumed that k implementations $Impl_i$ are in the system, where $0<=i<k$. In block (440), counters i, opt, and OptUtil are initialized. The counter i is used to index the implementations $Impl_i$, and an arbitrary guess for the location of the best implementation $C_F$. For example, this initial guess may be set at $Impl_{opt}$, where i=opt=OptUtil=0. In block (450), a test is performed to determine whether all of the implementations have been evaluated. If all the implementations were tested, $Impl_{opt}$ is output in block (490) and the method ends at block (499). However, if all the implementations were not tested, $U_P$ and $B_P$ are evaluated on the training set, using $Impl_i$ in block (460). The cost of using $Impl_i$ is then tested in block (470) by comparing $B_P$ with MaxCost, a maximum tolerable cost value that is application dependent. If $B_P>=$MaxCost, then the counter i is incremented in block (495) and the method resumes at block (450). If $B_P<$MaxCost, then process utility $U_P$ is examined in block (480). If $U_P<=$OptUtil, the current implementation is not optimal and the computation is resumed at block (495), where another implementation for F is ready to be tested. If $U_P>$OptUtil, opt is set to i and OptUtil is set to the current value for $U_P$ in block (492). The method then resumes at block (495), where i is incremented and another implementation for F is ready to be tested.

Figure 5:
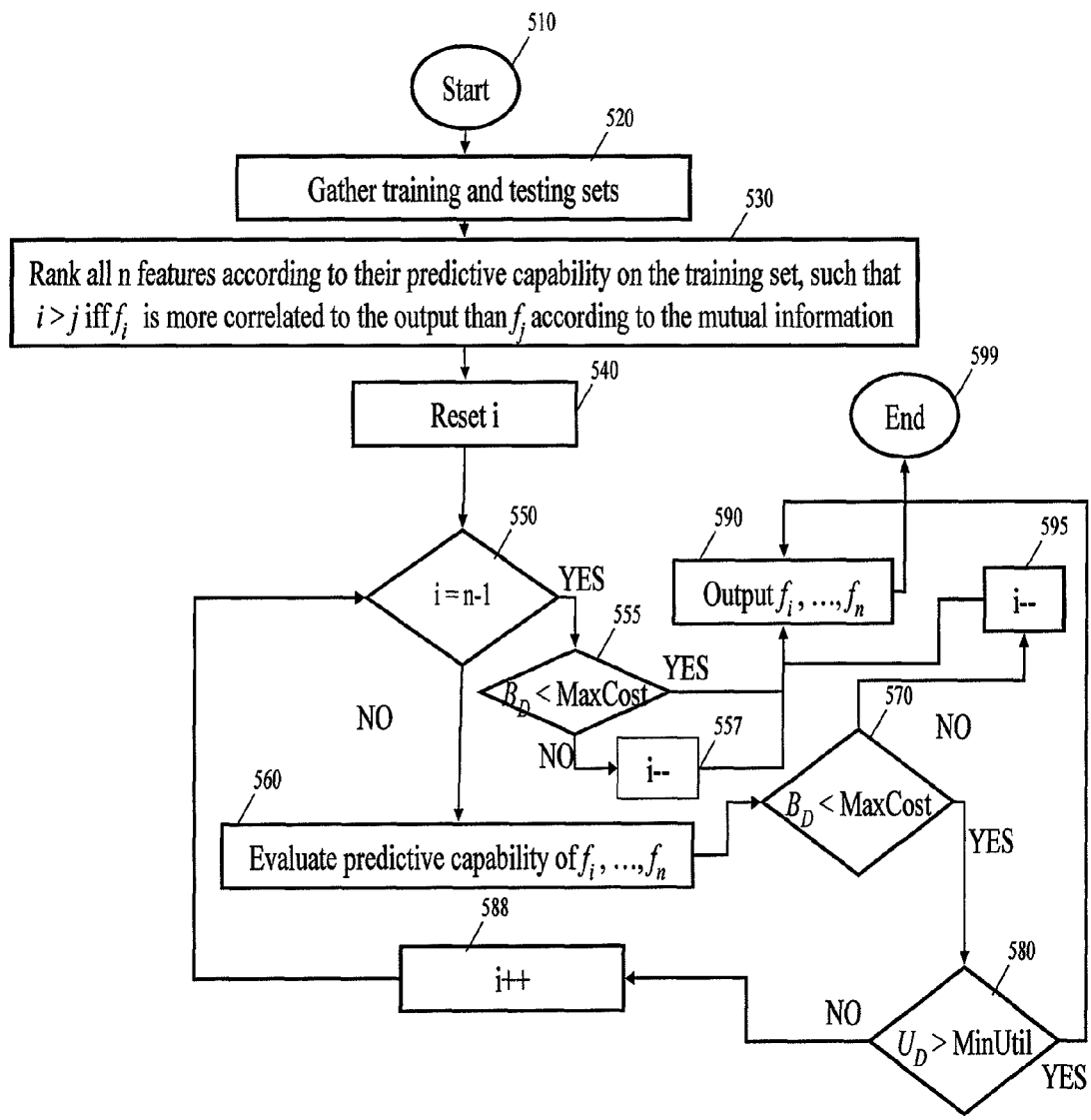
FIG. 5 illustrates a method of selecting features that may be used in the method of FIG. 3, according to an exemplary embodiment of the present invention.

FIG. 5 illustrates a method for selecting the features in block (395) of FIG. 3, according to an exemplary embodiment of the present invention. The purpose of the method is to select inputs that minimize the data cost under data utility constraints. After the method begins in block (510), training and testing sets are gathered in block (520). In block (530) all inputs are ranked according to their predictive capabilities on the training set. In a preferred embodiment of the present invention, the information theoretical concept of mutual information is used to rank the inputs. This ranking is done in ascending correlation order, meaning that if i>j, then $f_i$ is more correlated to the output than $f_j$. In block (540), a counter i, that is used to index the ranked inputs, is initialized. In block (550), a test is performed to determine whether all the inputs have been tried. If all the inputs have not been tried, the predictive capability of the inputs $f_i, \ldots, f_n$ is evaluated in block (560). In block (570), the resulting cost is examined. MaxCost is assumed to be the maximum tolerable cost for an application. If $B_D<$MaxCost, the utility is tested in block (580), by comparing $U_D$ to MinUtil, where MinUtil is the minimum amount of utility needed for the application. If $U_D>$MinUtil, the utility constraints have been met and the method resumes to block (590), where an output is generated from inputs $f_i, \ldots, f_n$. The method then ends at block (599). If $U_D<=$MinUtil, more inputs for the classification are considered by incrementing variable i in block (588) and enabling the method to resume at block (550). If $B_D>=$MaxCost, the cost budget has been exceeded and i is decremented in a block (595) to reduce the size of the input. The method then resumes at block (590). However, if all the inputs have been tried, a test is performed in block (555) to determine whether the cost budget has been exceeded. If $B_D<$MaxCost, the method resumes to at block (590). If $B_D>=$MaxCost, the variable i is decremented in block (557) and the method then resumes to block (590).

Figure 6:
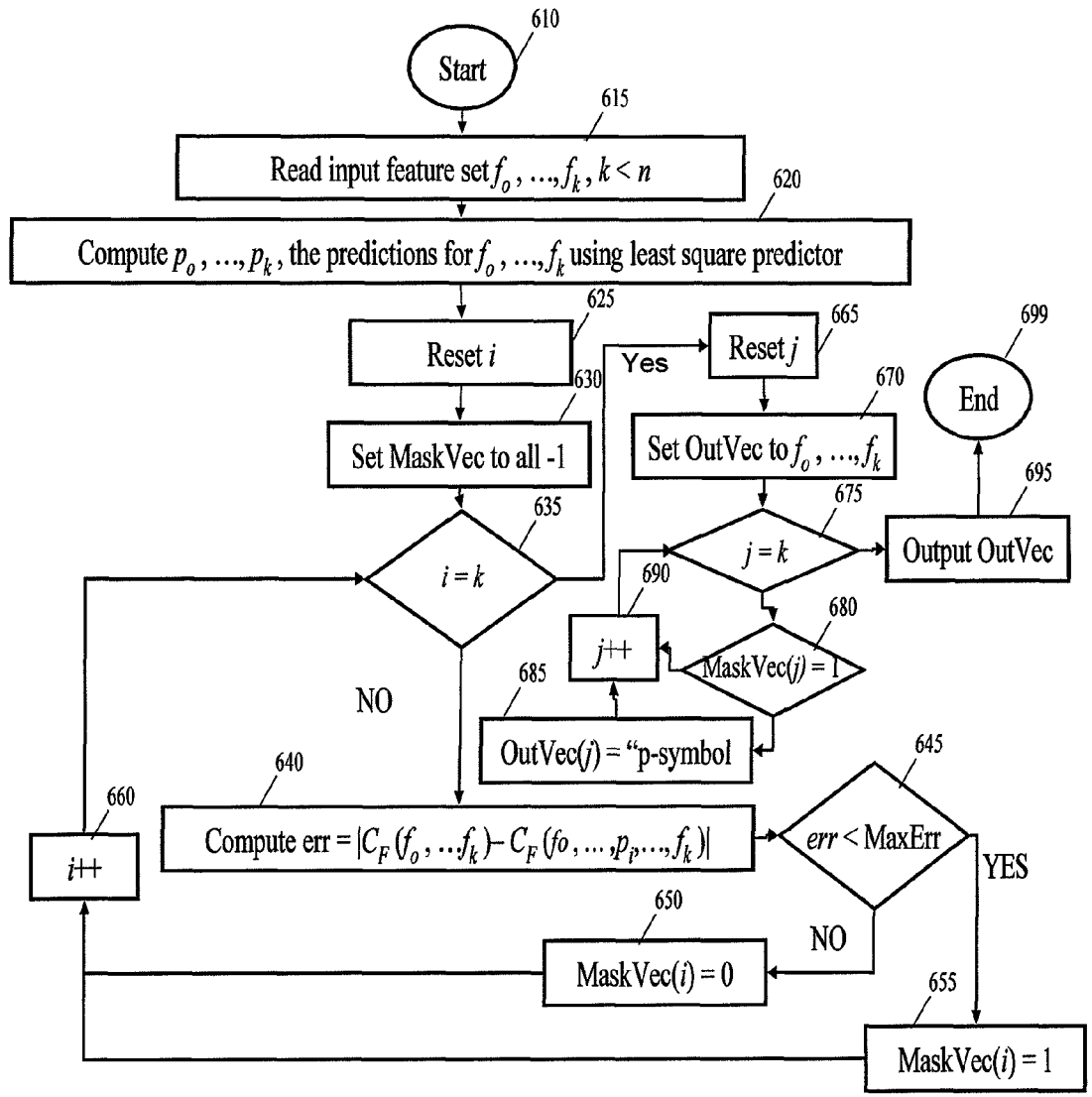
FIG. 6 illustrates a method for predicting the features not selected by the method of FIG. 5, according to an exemplary embodiment of the present invention.

FIG. 6 illustrates a method for predicting the features not selected by the method of FIG. 5, according to an exemplary embodiment of the present invention. A preferred embodiment of the present invention uses a prediction mechanism that allows new inputs to be predicted from past inputs. Assuming signal stationarity, within short time intervals, input features can be predicted via temporal linear prediction. The value of an input feature i unavailable at time t may be predicted from its past M samples according to equation 7 as follows:

$$f'_{i,t} = \sum_{k=1}^{M} \omega_k f_{i,t-k}, \text{ with } \omega_k = \min_{\arg \omega_k} E(|f'_{i,t} - f_{i,t}|^2), \quad (7)$$

where $f_{i,t}$ and $f'_{i,t}$ respective correspond to original and the predicted feature values. The optimal weighting $\omega_k$ in equation 7 can be solved with Levinson-Durbin recursion. After the method begins in block (610), the input feature set $f_0, \ldots, f_k$ to be predicted is read in for some value of k<n in block (615). Predictions for each input feature $f_i$ are then computed, generating predictions $p_i$, $0<=i<=k$ in block (620). In block (625), a counter i is initialized. After the initialization, a mask vector MaskVector of size k is initialized (e.g., its values are set to −1) in block (630). The MaskVector is used to track the inputs $f_i$ that can be predicted without degrading too much of the utility of the classification. In block (635), a test is performed to determined whether all the inputs have been tested. If all the input have not been tested, an error value err is computed in block (640) according to equation 8 as follows:

$$\text{err} = |CF(fo, \ldots, fk) - CF(fo, \ldots, pi, \ldots, fk)|, \quad (8)$$

where err represents the drop error induced by the input prediction procedure. In block (645), this err is tested against a maximal tolerable err value denoted MaxErr. If err>=MaxErr, then MaskVec is set at the ith position to zero in block (650) before incrementing variable i in block (660) and resuming the method at block (635). If err<MaxErr, MaskVec is set at the ith position to 1 in block (655) before incrementing i in block (660) and resuming the method at block (635). If all the inputs have been tested, an output using MaskVec is generated by initializing a counter j in block (665) before initializing OutVec, an output vector of input features to $f_0, \ldots, f_k$ in block (670). A test is then performed to determine whether j=k in block (675). If j is not equal k, a test is performed to determined whether MaskVec(j)=1 in block (680). If the index of the mask vector is set, then OutVec at position j can be set to a special symbol (p_symbol) in block (675). The symbol p_symbol indicates that the input feature at this position can be predicted. Then, the variable j is incremented in block (690) and the method resumes at block (675). If the index of the mask is not set, the prediction at position j was not accurate enough and OutVec is not modified. When this occurs, the method simply resumes at block (690) where the variable j is incremented.

If the prior test determines that j=k, an interleaved version of OutVec is output in block (695) before ending at block (699). The generation of the interleaved version of OutVec is obtained by making sure that during consecutive transmissions of OutVec, a p_symbol is not used at the same position. In this way, the predictor will be able to sustain a certain level of accuracy by not allowing temporal propagation of prediction errors.

It is to be understood that the particular exemplary embodiments disclosed above are illustrative only, as the invention may be modified and practiced in different but equivalent manners apparent to those skilled in the art having the benefit of the teachings herein. Furthermore, no limitations are intended to the herein described exemplary embodiments, other than as described in the claims below. It is therefore evident that the particular exemplary embodiments disclosed herein may be altered or modified and all such variations are considered within the scope and spirit of the invention.

What is claimed is:

1. A method of performing a classification, the method comprising:
   ranking, by a processor, a plurality of features of a training set according to how closely they are correlated to their corresponding classifications;
   extracting, by a processor, a plurality of features from input data; and
   selecting, by a processor, a subset of the plurality of features, according to the rankings such that a computational resource cost of the subset is less than a predefined computational resource maximum and a degree of utility achieved by a classification of the subset by a selected classifier is optimized and exceeds a predefined utility minimum;
   predicting one of the features of the sensor data that is not selected for the subset of features from a predefined number of past samples of the feature and adding the predicted feature to the subset of features; and
   classifying, by a processor, using the selected classifier and the resulting subset of features.

2. The method of claim 1, wherein the computational resource cost includes at least one of a data bandwidth size of the subset, a period of time needed by the classifier to classify the subset, an amount of memory needed by the classifier to classify the subset, or an amount of power needed by the classifier to classify the subset.

3. The method of claim 1, wherein ranking the features comprises:
   determining symmetric uncertainty values between each feature and each feature's corresponding classification; and
   ordering the features by their symmetric uncertainty values.

4. The method of claim 1, wherein the features are ranked using a fast correlation-based filter operation.

5. The method of claim 1, wherein selection of the classifier comprises:
   inputting a type of classification problem;
   retrieving a list of classifiers that corresponds to the type, wherein the classifiers have been previously ranked based on their degree of utility at classifying data for the type; and
   setting the selected classifier to a classifier from the list that has the highest rank.

6. The method of claim 5, wherein the ranking of the classifier comprises:
   for each one of the classifiers, performing a classification operation on the training set using the current classifier;
   monitoring the classification operation to determine a measure of resources expended by the operation; and
   ordering the classifiers by the resource measures.

7. The method of claim 6 further comprises:
   for each one of the classifiers, determining a measure of utility of the current classifier based on a difference between classifications generated by the current classifier and the classifications in the training set; and
   wherein the ordering of the classifiers is further based on the utility measures.

8. The method of claim 1, wherein the predicted feature is only added to the subset of features when an error between the predicted feature and the past samples is below a predefined prediction error value.

9. A distributed system for classifying remote sensor data, the system comprising:
   a plurality of sensors receiving sensor data;
   a feature ranking unit to rank features in training data based on how well the features in the training data correlate with their classifications;
   a feature selection unit configured to select a subset of features of the sensor data, according to the ranking of the features of the training data, wherein the feature selection unit predicts one of the features of the sensor data that is not selected for the subset of features from a predefined number of past samples of the feature and adds the predicted feature to the subset of features; and
   a classification selection unit that selects one of a plurality of classifiers for classifying the resulting subset of features.

10. The distributed system of claim 9, wherein the sensor data includes electrocardiogram (ECG) data.

11. The distributed system of claim 10, further comprising a preprocessing unit to remove noise from the sensor data.

12. The distributed system of claim 11, wherein the preprocessing unit includes a low pass filter with a pass-band ranging from about 0.4 to about 40 Hertz.

13. The distributed system of claim 11, further comprising a feature extraction unit to extract the features from the sensor data.

14. The distributed system of claim 13, wherein the feature extraction unit includes a Q wave, R wave, and S wave (QRS)

detector to delimitate beats in the ECG data for use by the feature extraction unit extract the features.

15. The distributed system of claim 13, wherein the feature extraction unit performs at least one level of wavelet transform on the sensor data to extract the features.

16. The distributed system of claim 15, wherein the wavelet transform is a Haar wavelet transform.

17. A program storage device readable by machine, tangibly embodying a program of instructions executable by the machine to perform method steps for compressing sensor data, the method steps comprising:
- receiving a training set that includes a plurality of features and their corresponding classifications;
- ranking the features according to how closely they are correlated to their corresponding classifications;
- beginning with the highest ranked feature and until an optimum subset of features has been determined, adding a next feature of the ranked features to a set of features; and
- setting the optimum subset of features to the current set of features when a cost of the current set of features is less than a predefined minimum cost; and
- compressing the sensor data by removing features of the sensor data that do not match the optimum subset of features.

18. The program storage device of claim 17, wherein the cost includes a measure of the data bandwidth of the set of the features.

19. The program storage device of claim 17, wherein the ranking of the features comprises:
- determining symmetric uncertainty values between each feature and its corresponding classification; and
- ordering the features according to their symmetric uncertainty values.

20. The program storage device of claim 19, wherein the symmetric uncertainty values are determined using a fast correlation-based filter (FCBF) operation.

21. The program storage device of claim 20, wherein the FCBF operation determines the symmetric uncertainty values between each feature and each feature's corresponding classification.

22. A method of performing a classification, the method comprising:
- ranking, by a processor, a plurality of features of a training set according to how closely they are correlated to their corresponding classifications;
- extracting, by a processor, a plurality of features from input data; and
- selecting, by a processor, a subset of the plurality of features, according to the rankings such that a computational resource cost of the subset is less than a predefined computational resource maximum and a degree of utility achieved by a classification of the subset by a selected classifier is optimized and exceeds a predefined utility minimum,
- wherein the ranking comprises using a fast correlation-based filter (FCBF) operation to determine uncertainty values between each feature and each feature's corresponding classification and ordering the features by their corresponding uncertainty values.

* * * * *